United States Patent [19]
Levine

[11] Patent Number: 4,835,067
[45] Date of Patent: May 30, 1989

[54] CORROSION RESISTANT ELECTROPLATING PROCESS, AND PLATED ARTICLE

[75] Inventor: Samuel W. Levine, Roslyn, N.Y.

[73] Assignee: Electro Alloys Corp., Elmsford, N.Y.

[21] Appl. No.: 146,350

[22] Filed: Jan. 21, 1988

[51] Int. Cl.$^4$ .............................................. B32B 15/18
[52] U.S. Cl. .................................. 428/669; 174/52.4; 204/40; 204/44.3; 204/44.5; 204/44.6; 204/46.1; 204/47; 204/47.5; 204/49; 357/74; 428/680; 428/926; 428/935
[58] Field of Search ............... 428/669, 672, 680, 926, 428/935; 174/52 FP, 52 H; 357/74; 204/40, 44.3, 44.5, 44.6, 46.1, 47, 47.5, 49

[56] References Cited
U.S. PATENT DOCUMENTS

| | | | |
|---|---|---|---|
| 1,043,578 | 11/1912 | Eldred | 428/672 |
| 1,571,541 | 2/1926 | Davignon | 428/669 |
| 2,897,584 | 8/1959 | Schumpelt | 428/672 |
| 4,141,029 | 2/1979 | Dromsky | 174/52 FP |
| 4,451,540 | 5/1984 | Baird et al. | 174/52 FP |
| 4,601,958 | 7/1986 | Levine | 428/672 |
| 4,649,229 | 3/1987 | Scherer et al. | 174/52 FP |
| 4,666,796 | 5/1987 | Levine | 428/670 |

*Primary Examiner*—Robert McDowell
*Attorney, Agent, or Firm*—Frishauf, Holtz, Goodman & Woodward

[57] ABSTRACT

To simplify manufacture of plated metal parts with high corrosion resistance especially suitable for use as sealing lids or cover elements for semiconductor packages, a substrate of Kovar, or Alloy 42, which are nickel-containing iron alloys, are electroplated with a base layer of a metal having an electromotive potential high with respect to that of the substrate, over which an intermediate layer is electroplated, which intermediate layer (16) has an electromotive potential which is low with respect to the base layer, and over that a cover layer (18) is plated which has an electromotive potential similar to that of the base layer. Suitable metals are gold-nickel-gold combinations, in which the gold layers should be over 10 microinches thick, preferably and in order to meet MIL-STD 883C, about 25 microinches thick. The intermediate layer (16), if of nickel, has an electromotive potential which is at the negative side of the electromotive series. Pin holes through the three layers may cause, under the influence of a corrosive atmosphere, migration of ions up to the base layer but, due to the arrangement of electromotive potentials of the intermediate and the cover layer, will not extend further so that the corroded substrate material will, effectively, form a plug for the pin hole and prevent progression of corrosion.

25 Claims, 1 Drawing Sheet

CORROSION RESISTANT ELECTROPLATING PROCESS, AND PLATED ARTICLE

The present invention relates to electroplating metal articles, and more particularly to plating semiconductor packages or components thereof to have high corrosion resistance, and the so plated articles.

BACKGROUND

High reliability semiconductor packages must have the exposed metal parts highly resistant to salt and corrosive atmospheres. If appreciable corrosion occurs, in time, the lid of the package will be penetrated and will lose its hermeticity. In addition, the corrosion will destroy the identification markings on the lid of the package.

Conditions for testing the package for corrosion are defined by MIL-STD 883C, Method 1009.4, Test Condition A. Plating of themetal parts of the package is governed by MIL-M-38510G which states that a single layer of nickel between 50 and 350 microinches, and a single layer of gold having a thickness of 50 to 225 microinches is used. Alternatively, a multi-layer structure of pure nickel and pure gold may be used where the sum of the thicknesses of the nickel layers is between 50 and 350 microinches and the sum of the thicknesses of the gold layers is between 50 and 225 microinches. The gold should have a purity of 99.7%, or better.

Corrosion occurs on the metal parts because of defects in the nickel and gold layers of plating. The defects may be induced by imperfections in the base metal—either Alloy F15 also known under the registered trademark Kovar, or Alloy 42. This defect is usually caused by some type of contamination such as alumina embedded in the metal surface. It is characteristic of both thin layers of nickel and gold that they will not bridge over the contaminating particle. The imperfection may also come about from contamination particles existing in the plating solutions. These particles plate out with the nickel and gold layers and leave microscopic channels in the protective plating. A tiny channel in the nickel layer will not be bridged by the outside gold layer and thereby leave a microscopic hole extending to the surface of the base metal.

Indications of corrosion are visually detected by a deposit of iron oxide surrounding the defect hole. In the MIL-STD 883C salt atmosphere corrosion test the chloride ion in the salt solution greatly accelerates the corrosion reaction. Since iron has a normal electrode potential of $-0.440$ volts in the electromotive series and gold has a normal electrode potential of $+1.4$ volts, diffusion of iron ions is accelerated to and through the gold layer where the iron oxide deposits around the hole in the gold layer. If the nickel layer had no defect in coincidence with the gold layer, corrosion would not take place.

The referenced patents, and especially U.S. Pat. No. 4,601,958, by the inventor hereof U.S. Pat. No. 4,666,796 is based on a Continuation application of the foregoing patent described a plating process and method for plated metal parts, suitable as sealing lids for semiconductor packages, in which an iron based alloy substrate layer is electroplated with a first layer of nickel; a first layer of gold then is electroplated on the first nickel layer. A second layer of nickel is electroplated over the first gold layer, and a second layer of gold is then electroplated over the second layer of nickel. Thus, four layers are sequentially electroplated on the substrate layer. Surprisingly, the resultant plated parts with the multiple nickel-gold layer sets exhibited higher salt atmosphere corrosion resistance than parts plated with a single nickel-gold set although, due to thinner layers, the overall use of gold could be reduced.

THE INVENTION

It is an object to simplify the process of plating metal articles, and particularly metal articles which contain iron as a major constituent, such as Alloy 42 or Kovar (also known as Alloy F15), and to provide a highly reliable, heat resistant plated article, suitable, for example, as a semiconductor package sealing lid.

Briefly, a metal article, such as a plate element suitable to form a semiconductor package lid, or a structure from which such package lids can be made is plated by electroplating only three layers on the metal article, namely a base layer electroplated on the metal article, which base layer is formed by a metal which has an electromotive potential which is high with respect to the electromotive potential of the metal of the article. A single intermediate layer is then electroplating over the base layer. The single intermediate layer is formed by a metal which has an electromotive potential substantially lower than the electromotive potential of the metal of the base layer. A final or cover layer is then electroplated on the intermediate layer. The cover layer is formed by a metal which has an electromotive potential which is high with respect to the base layer, preferably similar to that of the base layer.

Typically, the metal article includes nickel as a constituent component. Suitable materials for the base and cover layers then will be gold, with an electromotive force of $+1.4$ V, platinum ($+1.2$ V), and silver ($+0.8$ V); examples of metals that may be used as the intermediate layer are zinc, with an electromotive force of $-0.76$ V, chromium ($-0.56$ V), cadmium ($-0.4$ V), indium ($-0.3$ V), cobalt ($-0.28$ V), tin ($-0.14$ V), and preferably nickel ($-0.25$ V). The aforementioned MIL-STD 883C requires gold for the cover layer and nickel for the intermediate layer so that the difference between the electromotive potentials will be 1.65 V.

Preferably, the intermediate layer has an electromotive potential which is at the negative side of the electromotive series of metals, and the base layer as well as the cover layer are identical, for example gold, and have high electromotive potentials at the positive end of the electromotive series of metals.

The three-layer system has an additional, entirely unexpected advantage, particularly when the base layer is gold and the article is made of an iron containing alloy, which has nickel as a constituent component, such as Alloy F15 or Alloy 42. One of the most severe production problems is to make such plated components which meet quality control tests referred to as heat blistering tests. When an article made as a semiconductor package lid is heated, and the plating is not perfect, it has been found that some lots or parts develop blisters because, apparently, the plated layers do not properly adhere to each other or to the iron alloy substrate. Under stress, the blisters will peel off, and the peeled regions will present sites for severe corrosion. Parts which exhibit blistering are unacceptable and must be scrapped. A three-layer system in which gold is used as the base layer exhibited substantially better adhesion to F15 or Alloy 42 substrates than other layers in which nickel is applied on the substrate. The three-layer system thus provides for superior adhesion of the plating on the substrate with significant reduction in blistering over prior art articles.

DRAWINGS

FIG. 1 is a highly schematic fragmentary cross-sectional view through a semiconductor package cover lid, in which the dimensions of the substrates and the various lids are grossly distorted for clarity; and FIG. 2 is a fragmentary cross-section view through a portion of the cover lid of FIG. 1, to an enlarged scale, and illustrating a defect.

A table of the electromotive series listing the normal electrode potentials is found in each of the referenced U.S. Pat. Nos. 4,601,958 and 4,666,796 in column 6.

DETAILED DESCRIPTION

Figure 1:
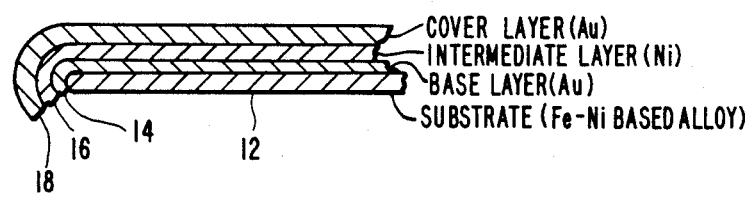

A substrate 12, for example of Alloy F15 (Kovar) or Alloy 42 has electroplated thereon a base layer 14 of gold. Kovar is an alloy of about 17% cobalt, 29% nickel, the balance iron, and a minor percentage of other elements; Alloy 42 is about 42% nickel, the balance iron, and a minor percentage of other elements—all percentages by weight. The substrate 12 may be of any desired thickness, and typically is in the order of about 0.25 mm (about 0.01 inch). The thicknesses shown in the drawings FIGS. 1 and 2 are not to scale, and are merely representative of the arrangement of the layer system.

A base layer 14 is electroplated over the substrate 12. The base layer 14 can be electroplated on one side only, or can be electroplated to cover the entire substrate 12. Any suitable plating process can be used, and reference may be had to the referenced U.S. Pat. No. 4,601,958, for example. The base layer 14 is, for example, a layer of gold; other materials may be used, e.g. copper, platinum, silver, palladium, or their alloys. The important characteristic of the layer 14 is that it has an electromotive potential of the electromotive series of metals which is high with respect to the electromotive potential of the substrate 12. A single intermediate layer 16 is electroplated over the layer 14. This layer, for example of nickel or a nickel-based alloy, has to have the characteristic that it has an electromotive potential which is lower than that of layer 14, for example somewhat similar to that of the substrate 12. Preferably, it has an electromotive potential which is at the negative side of the electromotive series of metals. Nickel is frequently used and is one of the metals which meets the MIL-STD. The cover layer 18 preferably is of the same material as that of the base layer, although it need not be. The plating cover layer should have an electromotive potential which is, however, similar to that of the base layer 14. The material should be so selected that the relative values of the electromotive potentials are such that the potential difference between the first and third layer of metal and the potential of the second layer is as large as possible. The greater this difference, the greater will be the corrosion reduction.

Figure 2:
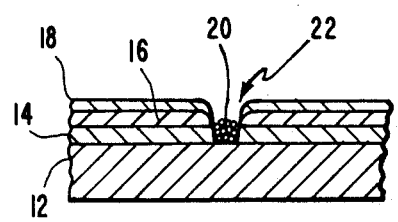

FIG. 2 illustrates a defect 22, which may be a pin hole for example of microscopic size. The dimensions of the substrate as well as of the respective layers are grossly exaggerated in order to better show the nature of the defect. The defect 22, as shown, extends to the base of the metal substrate. Neither nickel nor gold, electroplated over the substrate bridge over the defect; a typical defect which is not bridged is an alumina impurity, or other surface impurities.

Resistance to corrosion of the system 12, 14, 16, 18, in spite of a pin hole 22, is believed to be due to this effect: Plating the first layer 14 of gold having an Emf of 1.40 volts accelerates an ion from the substrate 12 to the level of the first or base layer of gold 14. However, the second or intermediate layer 16 of nickel having a negative Emf of 0.25 volts will tend to repel the ion which was attracted by the +1.40 volts of the gold layer. Since the third or outer or cover layer 18 of the gold has the same Emf as the base or first layer 14 of gold, there is no electrical potential betweeen the two layers 14, 18 of gold. As a result of this state of electrical potentials, an iron ion will not diffuse past the first layer 14 of gold. The ion will become iron oxide, schematically shown at 20, and actually plug the defect channel so that further corrosion is effectively inhibited.

This possible mechanism for greatly reducing the rate of corrosion is borne out by the experimental fact that even though a very slight amount of corrosion may take place in the first twenty-four hours of exposure to a salt spray atmosphere, no further corrosion is observed after forty-eight hours and seventy-two hours of exposure to the salt spray atmosphere.

The overall usual gold plating thickness for a standard plated part is fifty microinches or about 1.27 micrometers. Since gold is by far the most expensive component of the plated part, it is desirable to achieve the desired corrosion resistance without exceeding the fifty microinch (1.27 micrometer) dimension. In practice it has been found that excellent results are achieved by making the first layer 14 of gold about twenty-five microinches or about 0.64 micrometers thick, the second layer 16 of nickel about one hundred and fifty microinches (about 3.82 micrometers) thick, and the third outer layer of gold 18 about twenty-five microinches (about 0.64 micrometers) thick. Although excellent results are obtained with this distribution of thicknesses, the first layer of gold may vary from ten to forty microinches (about 0.25 to 1 micrometer), the second layer of nickel from fifty to three hundred and fifty microinches (about 1.27 to 6.36 micrometers), and the outer layer of gold from ten to two hundred and twenty five microinches (about 0.25 to 5.71 micrometers).

Although the example of plating with gold and nickel is given in the preceding situation, the same principle of plating with three layers of metal having the desired electromotive potentials can be used to significantly reduce corrosion resistance in electroplated systems. This principle states that the first and third layers 14, 18 of preferably the same metal must have an Emf high at the positive end of the electromotive series of metals and that the second layer 16 of the three layers must have an Emf substantially closer to that of the substrate 12, e.g. to iron and preferably at the negative side of the electromotive series of metals. Examples of metals that may be used as first and third layers are gold (Emf of +1.4 V), platinum (Emf of +0.83 v) and silver (+0.8 v). Examples of metals that may be used as the second layer are zinc (Emf of −0.76 V), chromium (Emf of −0.56 v), cadium (Emf of −0.40 v), indium (Emf of −0.3 V), cobalt (Emf of −0.28 v), nickel (Emf of −0.25 V) and tin (Emf of −0.136 v). The greater the potential difference between the first and third layer of metal and the potential of the second layer, the greater will be the corrosion reduction.

In my prior U.S. Pat. No. 4,601,958, a system was described in which an additional nickel layer was placed between the substrate 12 and the first gold layer 14. In accordance with the present invention, and upon a rethinking and restudy and experimentation with plating, it was concluded that the first layer of nickel on the substrate 12 was not needed to obtain the low corrosion characteristics. In fact, Alloy 42 as well as Kovar contain nickel, and placing an outer electroplated nickel layer on the nickel containing substrate 12 did very little in modifying the electromotive force relationships at the substrate which would be "seen" by the next layer of gold. Accordingly, experiments were carried out with a three-layer system in accordance with the present invention and it was found that effectively zero corrosion could be obtained. Surprisingly, the system had the additional advantage of being substantially more resistant to blistering under high temperature tests since the adhesion of gold, for example, to the substrate 12 is better than that of nickel on the substrate.

The thicknesses of the respective layers 14, 16, 18 are not critical. Preferably, the layers 14, 18 should be over 10 microinches; below a thickness of 10 microinches, the reliability and resistance to pin holes, as well as uniformity of quality is difficult to maintain. Increasing the thickness of the gold layers beyond 25 microinches, however, does not appear to improve the integrity of the cover layer and may only lead to excessive use of an expensive material.

I claim:

1. A plated metal part comprising
a substrate (12) of a metal which is corrodable in a corrosive or salt atmosphere environment; and
only three layers electroplated on said substrate, said only three layers comprising
a base layer (14) electroplated on the substrate and comprising a metal from the group consisting: of gold, platinum, silver, palladium, or their alloys;
a single intermediate layer (16) electroplated on the base layer (14) and comprising nickel or a nickel-based alloy; and
a cover layer (18) electroplated on the intermediate layer (16) and comprising a metal selected from the group consisting of: gold, silver, palladium, or their alloys.

2. The article of claim 1, wherein the base layer (14) and the cover layer (18), each, comprise gold.

3. The article of claim 2, wherein the gold layers have a thickness of over about 10 microinches; and
the intermediate layer (16) has a thickness of between about 50 to 350 microinches.

4. A corrosion resistant plated metal part forming a substrate (12) comprising an iron-based alloy (F15), or alloy 42; and
only three layers electroplated sequentially on said substrate to impart corrosion resistance to said substrate,
said only three layers comprising
a base layer (14) electroplated on the substrate (12) and comprising a metal selected from the group consisting of gold, platinum, silver, palladium, or their alloys;
a single intermediate layer (16) electroplated on the base layer (14) and comprising a nickel or nickel-based alloy; and
a cover layer (18) electroplated on the intermediate layer (16) and comprising a metal selected from the group consisting of gold, platinum, silver, palladium, or their alloys.

5. The article of claim 4, wherein said base layer (14) and said cover layer (18) comprise gold.

6. The article of claim 5, wherein the gold layers (14, 18) have a thickness of over about 10 microinches.

7. The article of claim 6, wherein the intermediate layer (16) has a thickness of between about 50–350 microinches.

8. The article of claim 5, wherein said base layer (14) has a thickness of about 25 microinches and said cover layer (18) has a thickness of at least about 25 microinches.

9. The article of claim 8, wherein said intermediate layer (16) has a thickness of at least about 150 microinches.

10. A corrosion resistant semiconductor package sealing cover comprising a substrate (12) comprising an iron-based alloy (F15), or alloy 42; and
only three layers electroplated sequentially on said substrate to impart corrosion resistance to said substrate,
said only three layers comprising
a base layer (14) electroplated on a substrate (12) and comprising a metal selected from the group consisting of gold, platinum, silver, palladium, or their alloys;
a single intermediate layer (16) electroplated on the base layer (14) and comprising a nickel or nickel-based alloy; and
a cover layer (18) electroplated on the intermediate layer (16) and comprising a metal selected from the group consisting of gold, platinum, silver, palladium, or their alloys.

11. The sealing cover of claim 10, wherein the intermediate layer (16) has a thickness of between about 50 to 350 microinches.

12. The sealing cover of claim 10, wherein said base layer (14) and said cover layer (18) comprise gold.

13. The sealing cover of claim 12, wherein said gold layers (14, 18) have a thickness of about 25 microinches.

14. The sealing cover of claim 12, wherein the gold layers (14, 18) have a thickness of over about 10 microinches.

15. The sealing cover of claim 14, wherein the intermediate layer (16) has a thickness of between about 50 to 350 microinches.

16. The sealing cover of claim 12, wherein said base layer (14) has a thickness of about 25 microinches and said cover layer (18) has a thickness of at least about 25 microinches.

17. The sealing cover of claim 16, wherein the intermediate layer (16) has a thickness of at least about 150 microinches.

18. A process of plating a metal substrate (12) comprising an iron-based alloy F15 or alloy 42 to make the substrate corrosion-resistant,
said process comprising the steps of
electroplating only three layers on said metal substrate, and
wherein the steps of electroplating said only three layers include electroplating, on said substrate (12) a first or base layer (14) which comprises a metal selected from the group consisting of: gold, platinum, silver, palladium, or their alloys;
electroplating, on said base layer (14) a single intermediate layer (16) which comprises a nickel or nickel-based alloy; and
electroplating on said single intermediate layer (16) a cover layer which comprises a metal selected from the group consisting of: gold, platinum, silver, palladium, or their alloys.

19. The process of claim 18, wherein said base layer (14) and said cover layer (18) comprise gold.

20. The process of claim 19, wherein said plating steps of plating the gold layers (14, 18) comprise plating said layers until they have a thickness of about 25 microinches.

21. The process of claim 19, wherein said plating steps of plating the gold layers (14, 18) comprise plating said layers until they have a thickness of over 10 microinches.

22. The process of claim 21, wherein said plating step of plating the intermediate layer (16) comprise plating said intermediate layer until it has a thickness between about 50 to 350 microinches.

23. The process of claim 21, wherein the plating steps of plating said gold base layer (14) and said gold cover layer (18) comprise plating said gold layers until they have a thickness of over about 10 microinches;

and wherein said plating step of plating said intermediate layer (16) comprises plating said intermediate layer until it has a thickness of about 150 microinches.

24. The process of claim 19, wherein said plating steps of plating the gold layers (14, 18) comprising plating said layers until said base layer (14) has a thickness of about 25 microinches and said cover layer (18) has a thickness of at least about 25 microinches.

25. The process of claim 24, wherein said plating step of plating the intermediate layer (16) comprises plating said intermediate layer until it has a thickness of about 150 microinches.

* * * * *